United States Patent
Weng et al.

(10) Patent No.: US 7,495,421 B2
(45) Date of Patent: Feb. 24, 2009

(54) MULTI-PHASE BUCK CONVERTER

(75) Inventors: Hsiang-Chung Weng, Taipei (TW); Sun-Chen Yang, Taipei (TW)

(73) Assignee: Asustek Computer Inc., Taipei (TW)

( * ) Notice: Subject to any disclaimer, the term of this patent is extended or adjusted under 35 U.S.C. 154(b) by 189 days.

(21) Appl. No.: 11/514,999

(22) Filed: Sep. 5, 2006

(65) Prior Publication Data

US 2007/0063679 A1    Mar. 22, 2007

(30) Foreign Application Priority Data

Sep. 20, 2005   (TW)   ............... 94132465 A

(51) Int. Cl.
  *G05F 1/618*   (2006.01)
  *G05F 1/62*    (2006.01)
(52) U.S. Cl. .................. 323/272; 323/225; 323/247
(58) Field of Classification Search ........... 323/225, 323/247, 268, 272, 328, 345, 349, 351; 363/65
  See application file for complete search history.

(56) References Cited

U.S. PATENT DOCUMENTS 6,696,823 B2 *   2/2004   Ledenev et al. ............ 323/272
6,897,641 B1 *   5/2005   Herbert ...................... 323/282
2004/0080965 A1 *   4/2004   Poon et al. .................. 363/125

* cited by examiner

*Primary Examiner*—Gary L Laxton
(74) *Attorney, Agent, or Firm*—Rabin & Berdo, P.C.

(57) ABSTRACT

A multi-phase buck converter comprising a first switch set, a second switch set, a capacitor, a first power storing and coupling unit, and a second power storing and coupling unit is provided. The first and the second switch sets are for providing an input voltage and a low voltage. One end of the capacitor is coupled to the low voltage, and the other end generates an output voltage. The first and the second power storing and coupling units are respectively coupled between the capacitor and the first switch set and between the capacitor and the second switch set. The first power storing and coupling unit comprises a primary coil and a first inductance. The second power storing and coupling unit comprises a secondary coil and a second inductance. During a first, a second and a third period, the first inductance and the second inductance respectively store, release, and store power.

18 Claims, 5 Drawing Sheets

MULTI-PHASE BUCK CONVERTER

This application claims the benefit of Taiwan application Ser. No. 94132465, filed Sep. 20, 2005, the subject matter of which is incorporated herein by reference.

BACKGROUND OF THE INVENTION

1. Field of the Invention

The invention relates in general to a buck converter, and more particularly to a multi-phase buck converter.

2. Description of the Related Art

The buck converter is a practical converter for providing an output voltage smaller than the input voltage so as to step down the voltage. Referring to FIG. 1, a conventional buck converter is shown. The buck converter 100 comprises an NMOS switch M11, an NMOS switch M12, an inductance L11 and a capacitor C11. The buck converter 100, according to an input voltage Vin1, outputs an output voltage Vout1 smaller than the voltage value of the input voltage Vin1. The drain of the NMOS switch M11 receives the input voltage Vin1, and the gate of the NMOS switch M11 receives a control signal S11. The drain of the NMOS switch M12 is coupled to the source of the NMOS switch M11, the gate of the NMOS switch M12 receives a control signal S12, and the source of the NMOS switch M12 is connected to the ground. The NMOS switch M11 and the NMOS switch M12 respectively receive the control signal S11 and control signal S12 to determine whether to be turned on. When the NMOS switch M11 is turned on, the NMOS switch M12 is turned off. When the NMOS switch M12 is turned on, the NMOS switch M11 is turned off.

Under the configuration of the buck converter 100, Vout1/Vin1=D, wherein D denotes a duty cycle. During a period T, the length during which the NMOS switch M11 is turned on is equal to DT, then the length during which the NMOS switch M12 is turned on is equal to (1−D)T. That is, during a period, the value of the output voltage is controlled by adjusting the length during which the switch element is turned on.

To avoid a switch element being overloaded and resulting in concentration of heat when providing an output voltage, multi-phase converting is used to facilitate the dissipation of the heat. Referring to FIG. 2, a conventional multi-phase buck converter is shown. The multi-phase buck converter 200, according to an input voltage Vin2, outputs a voltage smaller than an output voltage Vout2. The multi-phase buck converter 200 comprises six NMOS switches M21~M26 and three inductances L21~L23 and a capacitor C21. The NMOS switches M21 and M22 are controlled by the control signals S21 and S22, and generate a current I21 by the inductance L21. The NMOS switches M23 and M24 are controlled by control signals S23 and S24, and generate a current I22 by the inductance L22. The NMOS switches M25 and M26 are controlled by control signals S25 and S26, and generate a current I23 by the inductance L23.

Suppose the average current I24 is 120 A, each phase receives 40 A, that is, the average of the sum of the currents I21, I22 and I23, hence avoiding the heat being overcentralized. Referring to FIG. 3, a relevant signal wave pattern of the conventional multi-phase buck converter is shown. The phase of the control signal S21 is inverse to the phase of the control signal S22, the phase of the control signal S23 is inverse to the phase of the control signal S24, and the phase of the control signal S25 is inverse to the phase of the control signal S26. The current I21 fluctuates along with the control signal S21, the current I22 fluctuates along with the control signal S23, and the current I23 fluctuates along with the control signal S25. The currents I21, I22 and I23 are merged to form the current I24 fluctuating around the average value 120 A as shown in FIG. 3.

When the number of phases increases, the power storing frequency Fsw of the inductance increases accordingly, causing the peak current of the current to decrease relatively according to the formula: I2R=P, so that both the conduction loss and the switching power loss decrease accordingly. When the power storing frequency Fsw increases, the frequency width is increased, and the capacitor does not need to store too much power. Thus, the value or the number of capacitors may be reduced to reduce the costs.

However, if the power storing frequency Fsw is increased by directly increasing the switching frequency of the switch, power loss also increases accordingly. In addition, by adding an additional phase to increase the power storing frequency Fsw, corresponding elements such as switch element, inductance and output signal controller also need to be incorporated, hence extra costs are incurred. Therefore, how to increase the power storing frequency Fsw and at the same time avoid the abovementioned disadvantages has become an imminent issue to be resolved.

SUMMARY OF THE INVENTION

It is therefore an object of the invention to provide a multi-phase buck converter, which enables a two-phase buck converter to function as a three-phase buck converter by coupling the converter. The invention has the advantages of increasing power storing frequency, saving power, enlarging frequency width and reducing costs.

The invention achieves the above-identified object by providing a multi-phase buck converter. The multi-phase buck converter comprises a first switch set, a second switch set, a capacitor, a first power storing and coupling unit, and a second power storing and coupling unit. The first switch set is for providing an input voltage and a low voltage. The second switch set is for providing an input voltage and a low voltage. One end of the capacitor is coupled to the low voltage, and the other end of the capacitor generates an output voltage. The first power storing and coupling unit is coupled between the capacitor and the first switch set, and generates a first current. The second power storing and coupling unit is coupled between the capacitor and the second switch set, and generates a second current. When the first current is increasing, the first current drives the second current to increase as well. When the second current is increasing, the second current drives the first current increase as well.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1:
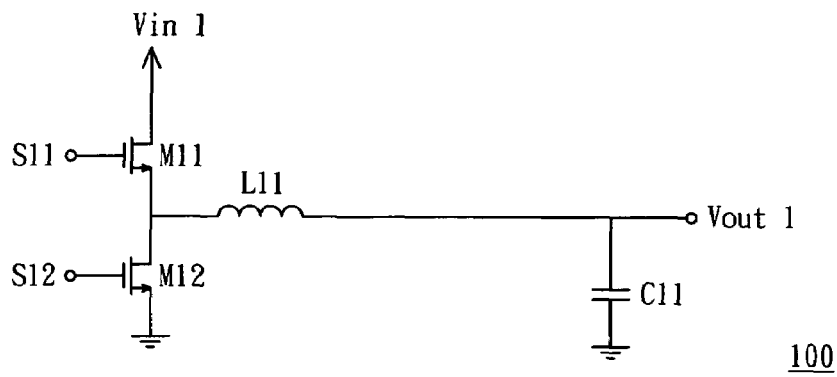
FIG. 1 is a conventional buck converter.
Figure 2:
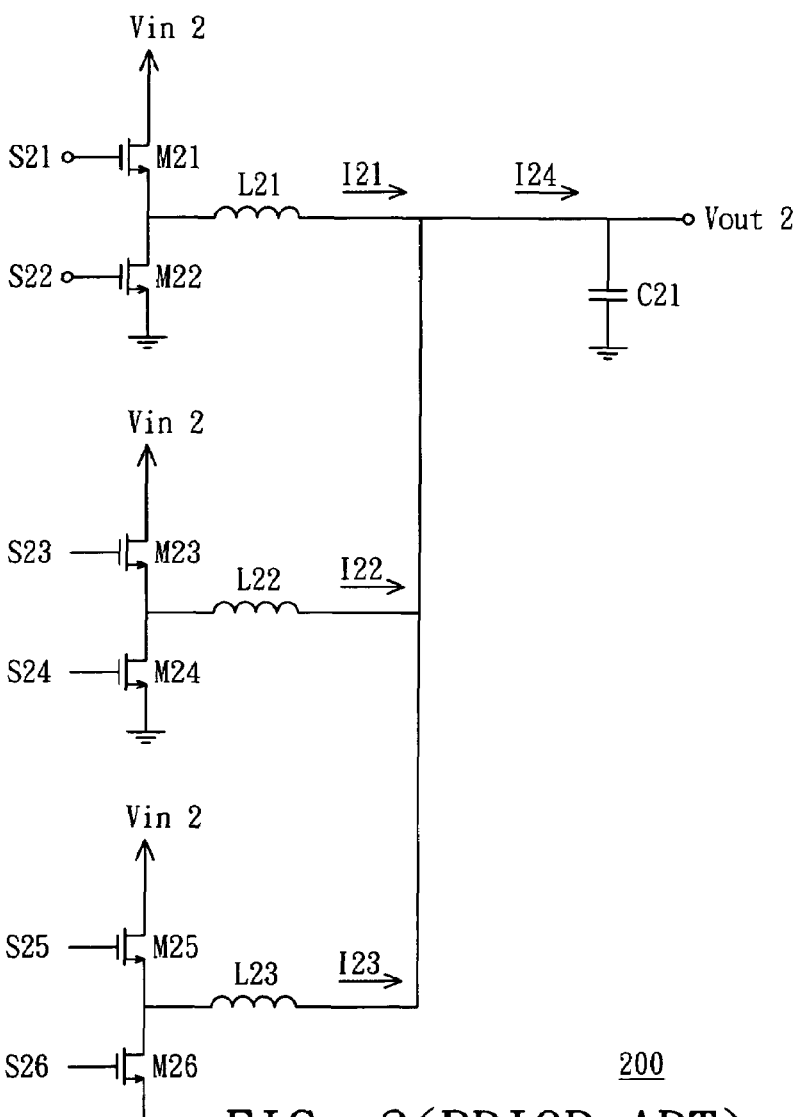
FIG. 2 is a conventional multi-phase buck converter.
Figure 3:
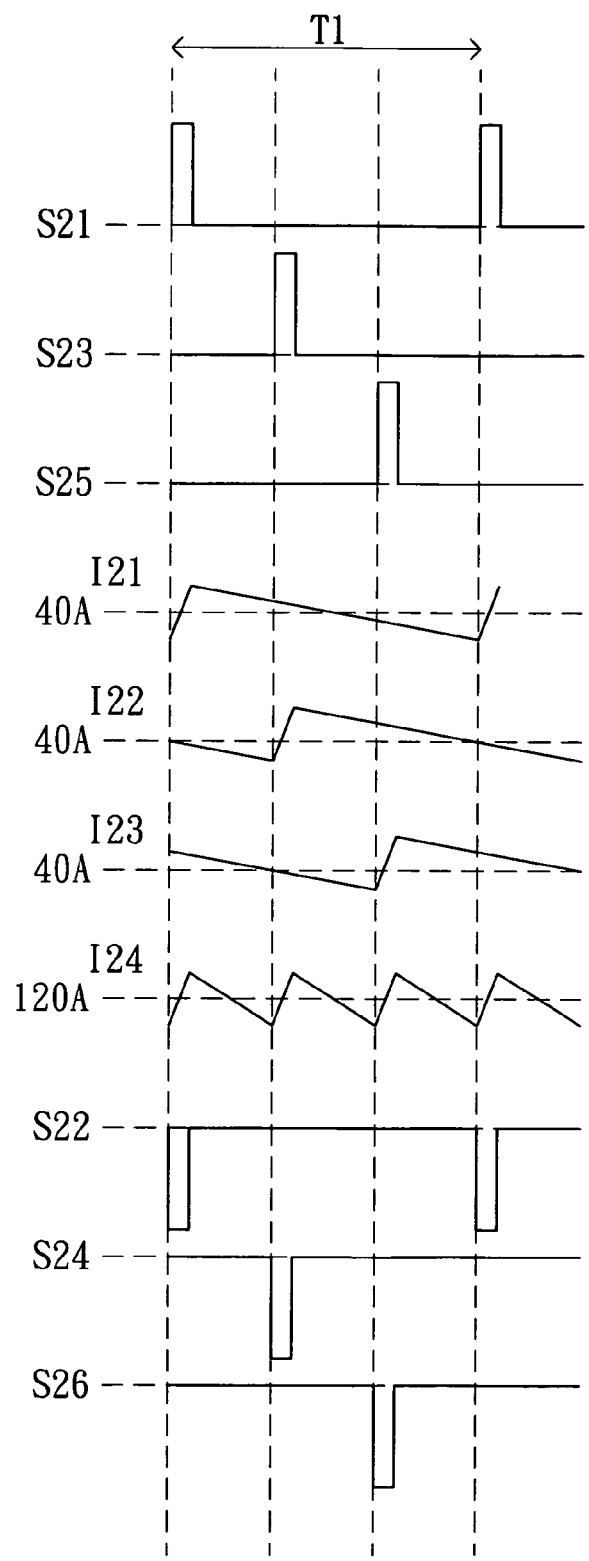
FIG. 3 is a relevant signal wave pattern of the conventional multi-phase buck converter.
Figure 4A:
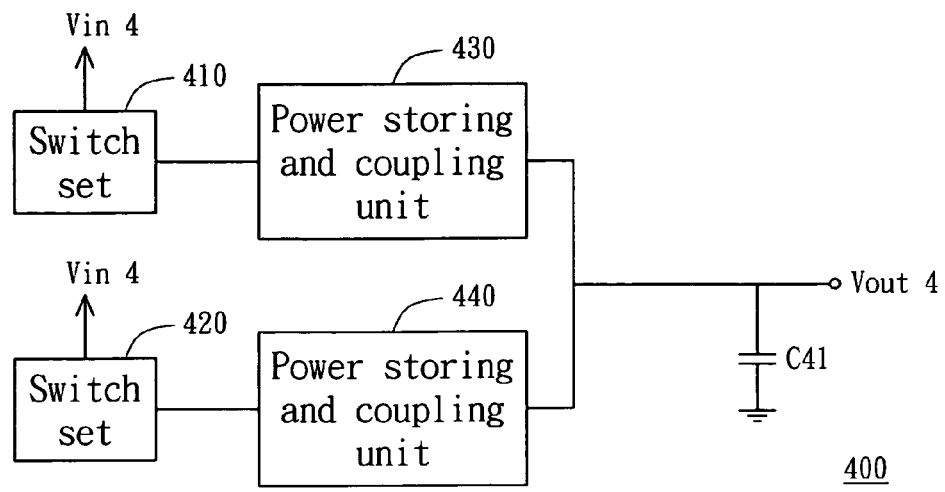
FIG. 4A is a block diagram of a multi-phase buck converter according to a first embodiment of the invention.

Referring to FIG. 4A, a block diagram of a multi-phase buck converter according to a first embodiment of the invention is shown. The multi-phase buck converter 400 comprises a switch set 410, a switch set 420, a power storing and coupling unit 430, a power storing and coupling unit 440 and a capacitor C41. The switch set 410 is for providing an input voltage Vin4 or a low voltage to the power storing and coupling unit 430. In the present embodiment of the invention, the low voltage is a ground voltage. The switch set 420 is for providing an input voltage Vin4 or a ground voltage to the power storing and coupling unit 440. One end of the capacitor C41 is connected to the ground, and the other end of the capacitor C41 is coupled to the power storing and coupling unit 430 and the power storing and coupling unit 440 to generate an output voltage Vout4 smaller than the input voltage Vin4.

Figure 4B:
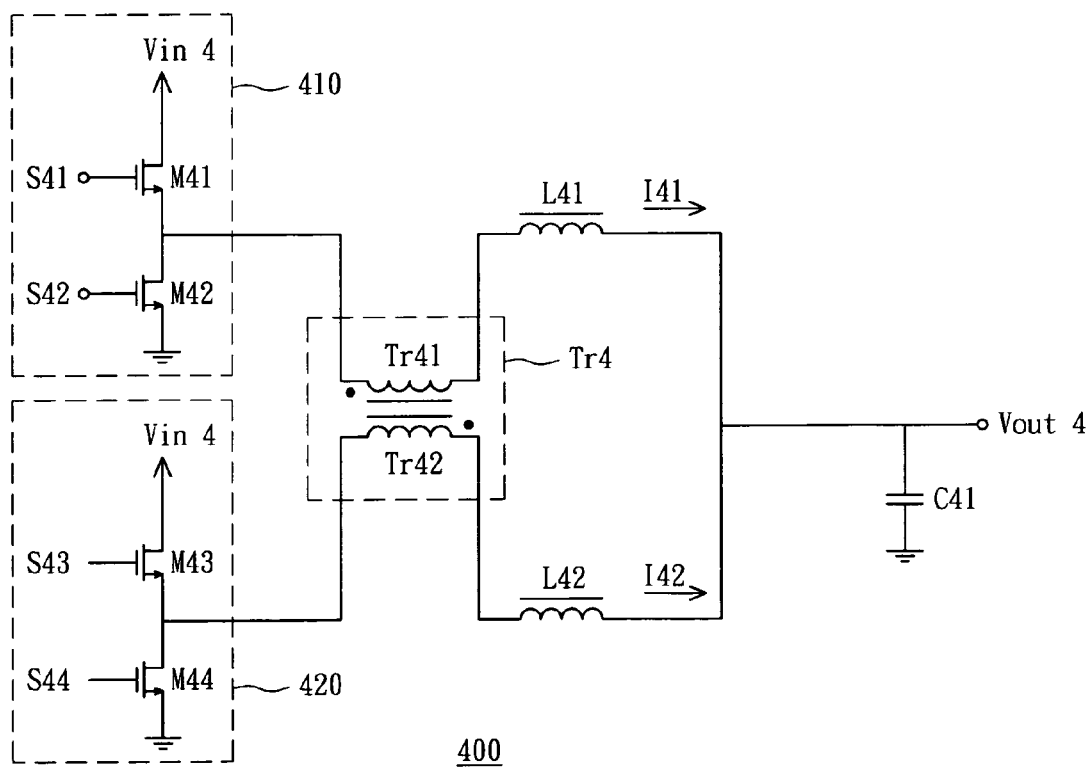
FIG. 4B is a circuit diagram of the multi-phase buck converter according to the first embodiment of the invention.

Referring to both FIG. 4A and FIG. 4B. FIG. 4B is a circuit diagram of the multi-phase buck converter according to the first embodiment of the invention. The power storing and coupling unit 430 comprises a primary coil Tr41 and an inductance L41. The power storing and coupling unit 430 is coupled between the capacitor C41 and the switch set 410 to generate a current I41. One end of the primary coil Tr41 is coupled to the switch set 410, the other end of the primary coil Tr41 is coupled to the inductance L41, and the other end of the inductance L41 is coupled to the capacitor C41. Current I41 is generated by providing the input voltage Vin4 to the power storing and coupling unit 430. The current I41 flows through the primary coil Tr41 and the inductance L41. The primary coil Tr41 and the inductance L41 are connected in serial. The power storing and coupling unit 440 comprises a secondary coil Tr42 and an inductance L42. The power storing and coupling unit 440 is coupled between the capacitor C41 and the switch set 420 to generate a current I42. One end of the secondary coil Tr42 is coupled to the switch set 420, the other end of the secondary coil Tr42 is coupled to the inductance L42, and the other end of the inductance L42 is coupled to the capacitor C41. Current I42 is generated by providing the input voltage Vin4 to the power storing and coupling unit 440. The current I42 flows through the secondary coil Tr42 and the inductance L42. The secondary coil Tr42 and the inductance L42 are connected in serial. The secondary coil Tr42 and the primary coil Tr41 form a converter Tr4.

The switch set 410 comprises an NMOS switch M41 and an NMOS switch M42. The drain of the NMOS switch M41 receives the input voltage Vin4, the gate of the NMOS switch M41 receives a control signal S41, and the source of the NMOS switch M41 is coupled to the primary coil Tr41. The drain of the NMOS switch M42 is coupled to the source of the NMOS switch M41, the gate of the NMOS switch M42 receives a control signal S42, the source of the NMOS switch M42 is connected to the ground. The switch set 420 comprises an NMOS switch M43 and an NMOS switch M44. The drain of the NMOS switch M43 receives the input voltage Vin4, the gate of the NMOS switch M43 receives a control signal S43, the source of the NMOS switch M43 is coupled to the secondary coil Tr42. The drain of the NMOS switch M44 is coupled to the source of the NMOS switch M43, the gate of the NMOS switch M43 receives a control signal S44, and the source of the NMOS switch M43 is connected to the ground.

Figure 5:
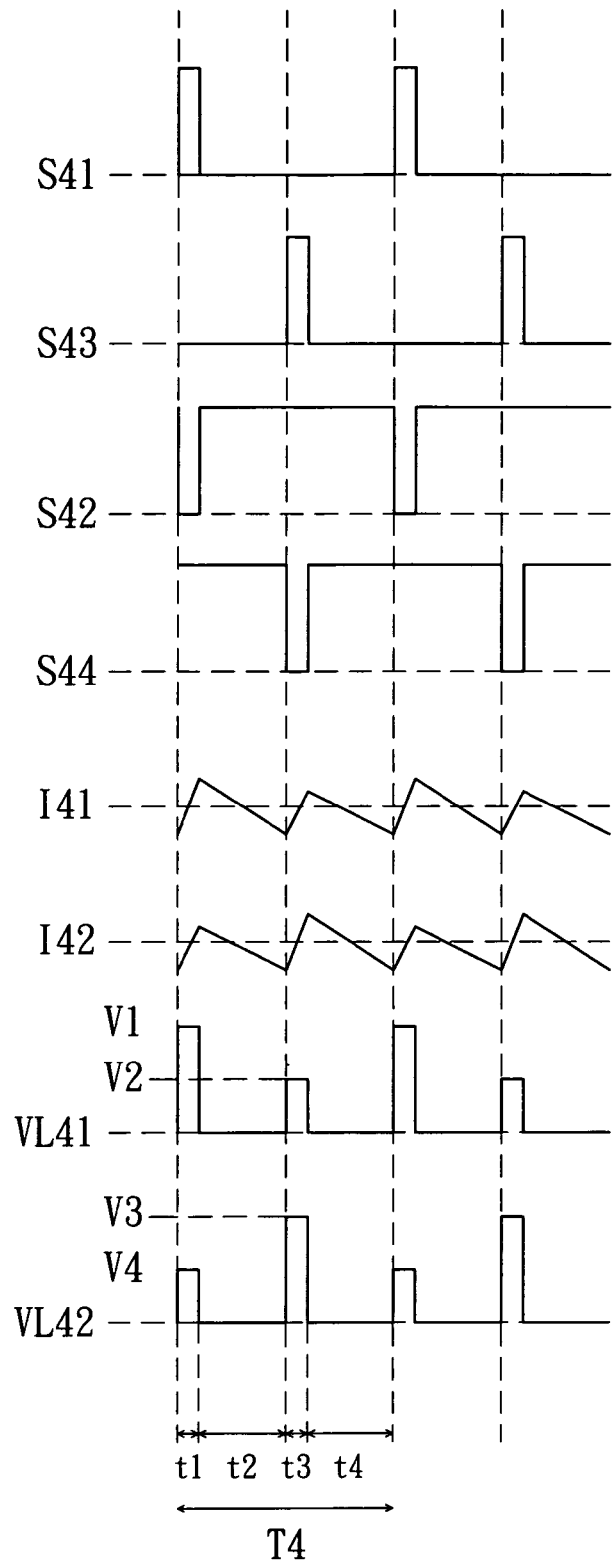
FIG. 5 is a relevant signal wave pattern of the multi-phase buck converter according to the first embodiment and the second embodiment.

Referring to FIG. 5, a relevant signal wave pattern of the multi-phase buck converter according to the first embodiment and the second embodiment is shown. The voltage VL41 is a cross-voltage of the inductance L41, and the voltage VL42 is a cross-voltage of the inductance L42. The multi-phase buck converter 400 is a two-phase buck converter. The phase of the control signal S41 is inverse to the phase of the control signal S42, the phase of control signal S43 is inverse to the phase of control signal S44. During a period T4, the phase of control signal S41 differs with the phase of control signal S43 by 180 degrees. Similarly, the phase of control signal S42 also differs with the phase of control signal S44 by 180 degrees.

When the multi-phase buck converter 400 is during period t1, the control signal S41 enables the NMOS switch M41 to be turned on, the control signal S44 enables the NMOS switch M44 to be turned on, the control signal S42 enables the NMOS switch M42 to be turned off, and the control signal S43 enables the NMOS switch M43 to be turned off, then the switch set 410 provides an input voltage Vin4, and the switch set 420 provides a low voltage. The primary coil Tr41 and the inductance L42 generate a current I41 according to the input voltage Vin4. Due to the power storing of the inductance L41, the current I41 is increasing. Meanwhile, the cross-voltage, which is generated when the current I41 flows through the primary coil Tr41, enables the secondary coil Tr42 to generate a corresponding cross-voltage and makes the current I42 increasing, such that the inductance L42 is in power storing state instead of power releasing state. During period t1, the inductances L41 and L42 are in power storing state. Due to the input voltage Vin4, the level of the voltage VL41 is V1. Due to the current I42, the level of the voltage VL42 is V4.

When the multi-phase buck converter 400 is during periods t2 and t4, the control signal S42 enables the NMOS switch M42 to be turned on, the control signal S44 enables the NMOS switch M44 to be turned on, the control signal S41 enables the NMOS switch M41 to be turned off, and the control signal S43 enables NMOS switch M43 to be turned off. The switch set 410 provides a low voltage and so does the switch set 420. The inductances L41 and L42 do not have any voltage to provide and start to release power, so the currents I41 and I42 are decreasing. Therefore, during periods t2 and t4, the inductances L41 and L42 are in power releasing state, and both the voltage VL41 and the voltage VL42 are zero.

When the multi-phase buck converter 400 is during period t3, the control signal S42 enables the NMOS switch M42 to be turned on, the control signal S43 enables the NMOS switch M43 to be turned on, the control signal S41 enables the NMOS switch M41 to be turned off, and the control signal S44 enables the NMOS switch M44 to be turned off. The switch set 410 provides a low voltage, and the switch set 420 provides an input voltage Vin4. The secondary coils Tr42 and inductance L42 generate the current I42 according to the input voltage Vin4. The cross-voltage, which is generated when the current I42 flows through the secondary coil Tr42, enables the primary coil Tr41 to generate a cross-voltage, such that the current I41 is increasing and the inductance L41 is in power storing state instead of power releasing state. During period t3, both of the inductances L41 and L42 are in power storing state. Due to the input voltage Vin4, the voltage VL42 is V3. Due to the current I41, the voltage VL41 is V2.

Compared with a conventional multi-phase buck converter, buck converter according to the present embodiment of the invention has an additional converter circuit. According to the theory of converter, when the current I41 flows through the primary coil Tr41 and is increasing, the converter circuit enables the secondary coil Tr42 to correspondingly generate a cross-voltage to affect the current I42, such that the inductance L42 once again stores power and increases power storing frequency. Alternatively, when the current I42 flows through the secondary coil Tr42 and is increasing, the converter circuit enables the primary coil Tr41 to generate a cross-voltage to affect the current I41, such that the inductance L41 once again stores power and increases power storing frequency.

According to the technology of the present embodiment of the invention, when the power storing frequency increases, the peak currents of the currents I41 and I41 decrease accordingly, hence reducing power loss. Furthermore, when the power storing frequency increases, the frequency width is enlarged and the capacitor does not need to store too much power, therefore the value and the number of capacitors may be decreased and the cost is further lowered down. Compared with the conventional practice, the present embodiment of the invention enables a two-phase buck converter to function as a three-phase buck converter and increase power storing frequency without increasing any additional phase.

Second Embodiment

Figure 6A:
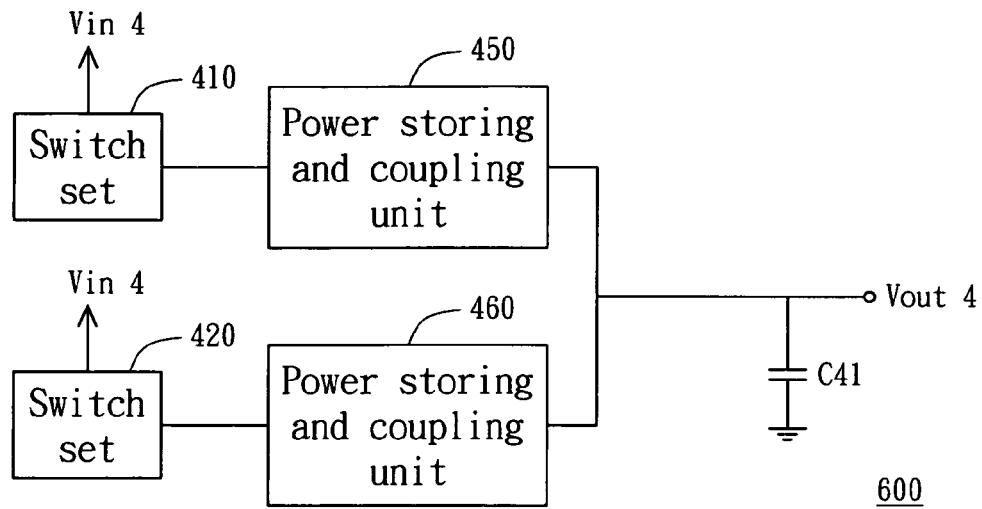
FIG. 6A is a block diagram of a multi-phase buck converter according to a second embodiment of the invention.
Figure 6B:
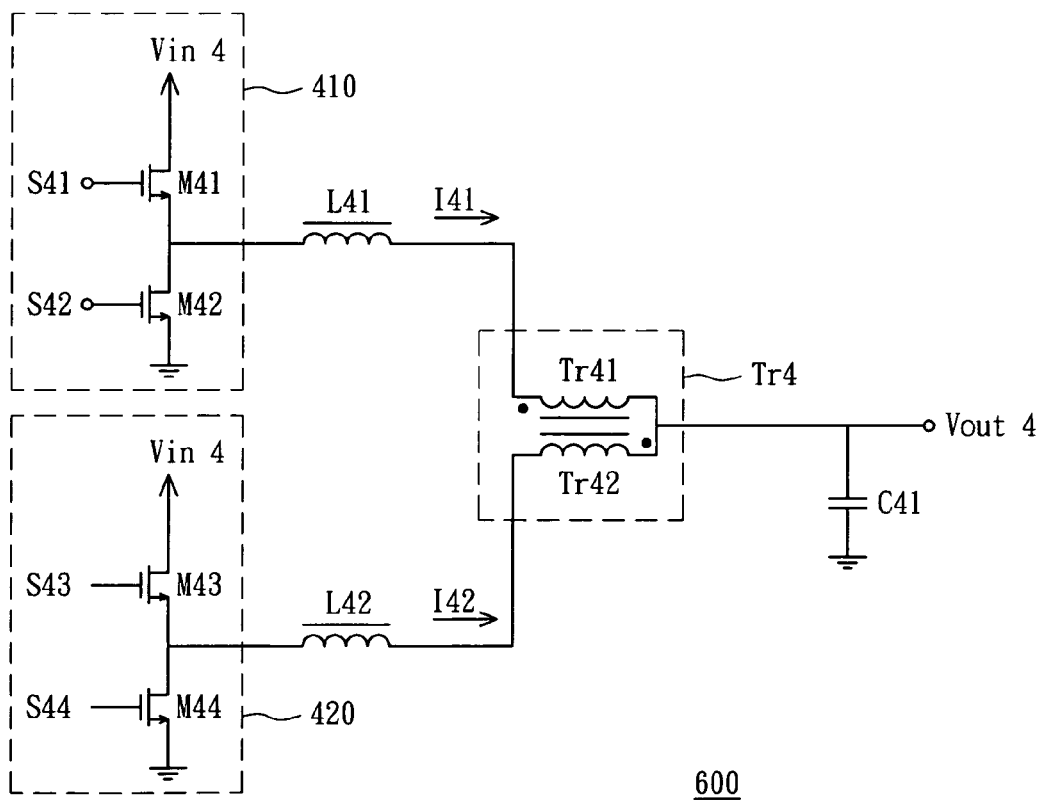
FIG. 6B is a circuit diagram of the multi-phase buck converter according to the second embodiment of the invention.

Referring to FIG. 6A, a block diagram of a multi-phase buck converter according to a second embodiment of the invention is shown. The multi-phase buck converter 600 comprises a switch set 410, a switch set 420, a power storing and coupling unit 450, a power storing and coupling unit 460, and a capacitor C41. The present embodiment differs with the first embodiment in that the circuit connection inside the power storing and coupling units 450 and 460 is different from the circuit connection inside the power storing and coupling units 430 and 440. Referring to both FIG. 6A and FIG. 6B. FIG. 6B is a circuit diagram of the multi-phase buck converter according to the second embodiment of the invention. The power storing and coupling unit 450 comprises a primary coil Tr41 and an inductance L41. One end of the primary coil Tr41 is coupled to the capacitor C41, the other end of the primary coil Tr41 is coupled to the inductance L41, and the other end of the inductance L41 is coupled to the switch set 410. The power storing and coupling unit 460 comprises a secondary coil Tr42 and an inductance L42. One end of the secondary coil Tr42 is coupled to the capacitor C41, the other end of the secondary coil Tr42 is coupled to the inductance L42, and the other end of the inductance L42 is coupled to the switch set 420.

The circuit of the multi-phase buck converter 600 is the same with the circuit of the multi-phase buck converter 400 except for the differences disclosed above. That is, the relevant wave pattern of the present embodiment of the invention is referred to FIG. 5 and is not repeated here.

By coupling the converters, the invention increases the power storing frequency of the inductance and enables a two-phase buck converter to function as a three-phase buck converter. The concept of the invention is applicable to a multi-phase buck converter having multiple phases such as four phases or six phases. Take the five-phase buck converter for example. The five-phase buck converter may be achieved by incorporating a conventional multi-phase buck converter with a multi-phase buck converter of the invention. The transistor for controlling the voltage outputted by the switch element is exemplified by an NMOS transistor but not limited thereto. For example, the NMOS transistor may be replaced by a junction type field effect transistor (JFET) switch element.

According to the multi-phase buck converter disclosed in the above embodiments of the invention, the two-phase buck converter increases the power storing frequency of the inductance and achieves the same function as the three-phase buck converter without increasing any additional phases. The multi-phase buck converter of the invention has the following advantages:

1. The peak current is decreased and so is the power loss;
2. The frequency width is increased;
3. The power storing frequency Fsw increases, so the capacitor does not need to store too much power and the value and amount of the capacitor may be decreased.
4. The number of capacitors is decreased without increasing any additional phases, hence reducing the costs.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-phase buck converter, comprising:
    a first switch set for providing an input voltage or a low voltage;
    a second switch set for providing the input voltage or the low voltage;
    a capacitor, wherein one end of the capacitor is connected to the low voltage and the other end of the capacitor generates an output voltage;
    a first power storing and coupling unit, which is coupled between the capacitor and the first switch set and generates a first current, wherein the first power storing and coupling unit comprises a primary coil, and a first inductance which stores power according to the input voltage, one end of the primary coil is coupled to the first switch set, the other end of the primary coil is coupled to one end of the first inductance, and the other end of the first inductance is coupled to the capacitor; and
    a second power storing and coupling unit, which is coupled between the capacitor and the second switch set and generates a second current;
    wherein, the first current is in increasing state and drives the second current to increase; and,
    the second current is in increasing state and drives the first current to increase.

2. The multi-phase buck converter according to claim 1, wherein the first switch set comprises:
    a first N-channel metal-oxide semiconductor (NMOS) switch, wherein the drain of the NMOS switch is coupled to the input voltage, and the gate of the NMOS switch receives a first control signal; and
    a second NMOS switch, wherein the drain of the second NMOS switch is coupled to the source of the first NMOS switch, the gate of the second NMOS switch receives a second control signal, and the source of the second NMOS switch is coupled to the low voltage;
    wherein, the phase of the first control signal is inverse to the phase of the second control signal.

3. The multi-phase buck converter according to claim 2, wherein the second switch set comprises:
    a third NMOS switch, wherein the drain of the third NMOS switch is coupled to the input voltage, and the gate of the third NMOS switch receives a third control signal; and
    a fourth NMOS switch, wherein the drain of the fourth NMOS switch is coupled to the source of the third NMOS switch, the gate of the fourth NMOS switch receives a fourth control signal, and the source of the fourth NMOS switch is coupled to the low voltage;

wherein the phase of the third control signal is inverse to the phase of the fourth control signal a phase difference exists between the first control signal and the third control signal, and the second control signal and the fourth control signal have the phase difference.

4. The multi-phase buck converter according to claim 1, wherein one end of the primary coil is coupled to the capacitor, the other end of the primary coil is coupled to one end of the first inductance, and the other end of the first inductance is coupled to the first switch set.

5. The multi-phase buck converter according to claim 1, wherein the second power storing and coupling unit comprises:
   a secondary coil forming a converter with the primary coil; and
   a second inductance, which stores power according to the input voltage.

6. The multi-phase buck converter according to claim 5, wherein one end of the secondary coil is coupled to the second switch set, the other end of the secondary coil is coupled to one end of the second inductance, and the other end of the second inductance is coupled to the capacitor.

7. The multi-phase buck converter according to claim 5, wherein one end of the secondary coil is coupled to the capacitor, the other end of the secondary coil is coupled to one end of the second inductance, and the other end of the second inductance is coupled to the second switch set.

8. The multi-phase buck converter according to claim 5, wherein when the multi-phase buck converter is during a first period, the first switch set provides the input voltage, the second switch set provides the low voltage, the first inductance is in a power storing state, the first power storing and voltage converting unit generates the first current according to the input voltage, and the first current flows through the primary coil, such that the secondary coil correspondingly generates a cross-voltage for enabling the second inductance to be in a power storing state.

9. The multi-phase buck converter according to claim 8, wherein when the multi-phase buck converter is during a second period, the first switch set provides the low voltage, the second switch set provides the low voltage, and the first inductance and the second inductance are in a power releasing state.

10. The multi-phase buck converter according to claim 9, wherein when the multi-phase buck converter is during a third period, the first switch set provides the low voltage, the second switch set provides the input voltage, the second inductance is in a power storing state, and the second power storing and voltage converting unit generates the second current according to the input voltage, and the second current flows through the secondary coil, such that the primary coil correspondingly generates a cross-voltage for enabling the first inductance to be in a power storing state.

11. A multi-phase buck converter, comprising:
   a first switch set for providing an input voltage or a low voltage;
   a second switch set for providing the input voltage or the low voltage;
   a capacitor, wherein one end of the capacitor is coupled to the low voltage and the other end of the capacitor generates an output voltage;
   a primary coil whose one end is coupled to the first switch set,
   a first inductance connected in serial with the primary coil and coupled to the capacitor, wherein a first current flows through the primary coil and the first inductance;
   a secondary coil, wherein the secondary coil forms a converter with the primary coil, and is connected to the second switch set; and
   a second inductance connected in serial with the secondary coil and coupled to the capacitor, wherein a second current flows through the secondary coil and the second inductances, wherein
      when the multi-phase buck converter is during a first period, the first switch set provides the input voltage, the second switch set provides the low voltage, the first inductance is in a power storing state, and a first current flows through the primary coil, such that the secondary coil correspondingly generates a cross-voltage for enabling the second inductance to be in a power storing state, and
      when the multi-phase buck converter is during a second period, the first switch set provides the low voltage, the second switch set provides the low voltage, and the first inductance and the second inductance are in a power releasing state.

12. The multi-phase buck converter according to claim 11, wherein the first switch set comprises:
   a first NMOS switch, wherein the drain of the first NMOS switch is coupled to the input voltage, the gate of the first NMOS switch receives a first control signal, and the source of the first NMOS switch is coupled to the primary coil; and
   a second NMOS switch, wherein the drain of the second NMOS switch is coupled to the source of the first NMOS switch, the gate of the second NMOS switch receives a second control signal, and the source of the second NMOS switch is coupled to the low voltage;
   wherein, the phase of the first control signal is inverse to the phase of the second control signal.

13. The multi-phase buck converter according to claim 12, wherein the second switch set comprises:
   a third NMOS switch, wherein the drain of the third NMOS switch is coupled to the input voltage, the gate of the third NMOS switch receives a third control signal, and the source of the third NMOS switch is coupled to the secondary coil; and
   a fourth NMOS switch, wherein the drain of the fourth NMOS switch is coupled to the source of the third NMOS switch, the gate of the fourth NMOS switch receives a fourth control signal, and the source of fourth NMOS switch is coupled to the low voltage;
   wherein, the phase of the third control signal is inverse to the phase of the fourth control signal; and a phase difference exists between the first control signal and the third control signal, and the second control signal and the fourth control signal have the phase difference.

14. The multi-phase buck converter according to claim 11, wherein when the multi-phase buck converter is during a third period, the first switch set provides the low voltage, the second switch set provides the input voltage, the second inductance is in power storing state, and the second current flows through the secondary coil, such that the primary coil correspondingly generates a cross-voltage for enabling the first inductance to be in a power storing state.

15. A multi-phase buck converter, comprising:
   a first switch set for providing an a input voltage or a low voltage;
   a second switch set for providing the input voltage or the low voltage;

a capacitor, wherein one end of the capacitor is coupled to the low voltage and the other end of the capacitor generates an output voltage;

a primary coil whose one end is coupled to the capacitor, a first inductance connected in serial with the primary coil and coupled to the first switch set, wherein a first current flows through the primary coil and the first inductance;

a secondary coil forming a converter with the primary coil and coupled to the capacitor; and a second inductance connected in serial with the secondary coil and coupled to the second switch set, wherein a second current flows through the secondary coil and the second inductances, wherein when the multi-phase buck converter is during a first period, the first switch set provides the input voltage, the second switch set provides the low voltage, the first inductance is in a power storing state, and a first current flows through the primary coil, such that the secondary coil correspondingly generates a cross-voltage for enabling the second inductance to be in a power storing state, and when the multi-phase buck converter is during a second period, the first switch set provides the low voltage, the second switch set provides the low voltage, and the first inductance and the second inductance are in a power releasing state.

16. The multi-phase buck converter according to claim 15, wherein the first switch set comprises:

a first NMOS switch, wherein the drain of the first NMOS switch is coupled to the input voltage, the gate of the first NMOS switch receives a first control signal, and the source of the first NMOS switch is coupled to the first inductance; and a second NMOS switch, wherein the drain of the second NMOS switch is coupled to the source of the first NMOS switch, the gate of the second NMOS switch receives a second control signal, and the source of the second NMOS switch is coupled to the low voltage;

wherein, the phase of the first control signal is inverse to the phase of the second control signal.

17. The multi-phase buck converter according to claim 16, wherein the second switch set comprises:

a third NMOS switch, wherein the drain of the third NMOS switch is coupled to the input voltage, the gate of the third NMOS switch receives a third control signal, and the source of the third NMOS switch is coupled to the second inductance; and a fourth NMOS switch, wherein the drain of the fourth NMOS switch is coupled to the source of the third NMOS switch, the gate of the fourth NMOS switch receives a fourth control signal, and the source of the fourth NMOS switch is coupled to the low voltage;

wherein, the phase of the third control signal is inverse to the phase of the fourth control signal a phase difference exists between the first control signal and the third control signal, and the second control signal and the fourth control signal have the phase difference.

18. The multi-phase buck converter according to claim 15, wherein when the multi-phase buck converter is during a third period, the first switch set provides the low voltage, the second switch set provides the input voltage, the second inductance is in a power storing state, and the second current flows through the secondary coil, such that the primary coil correspondingly generates a cross-voltage for enabling the first inductance to be in a power storing state.

* * * * *